D. E. CUMMINGS.
MILLING MACHINE.
APPLICATION FILED AUG. 16, 1915.

1,198,333.

Patented Sept. 12, 1916.
7 SHEETS—SHEET 5.

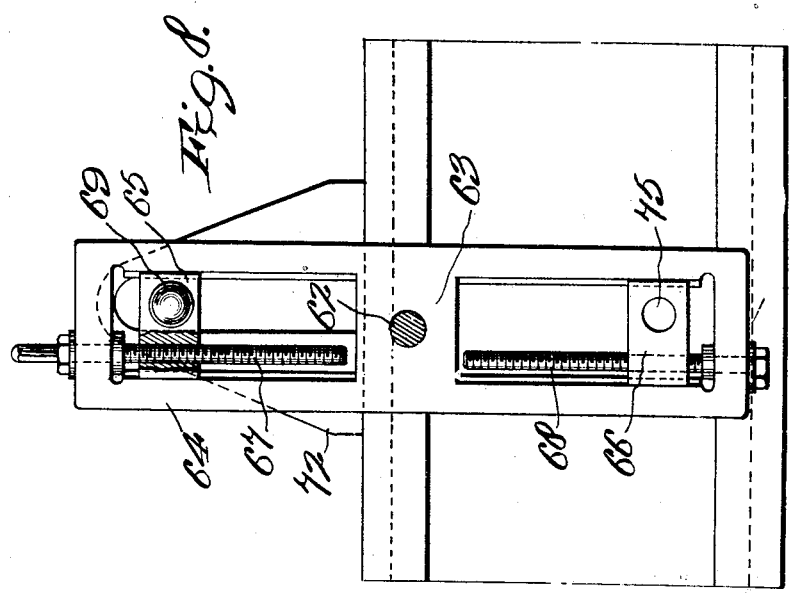
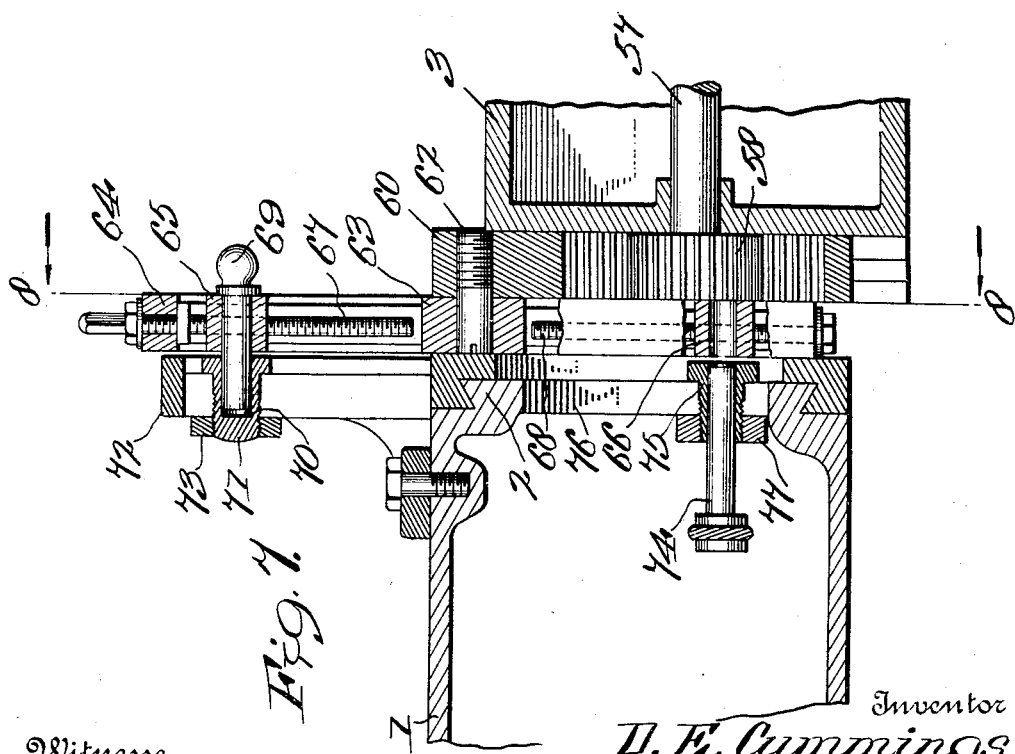

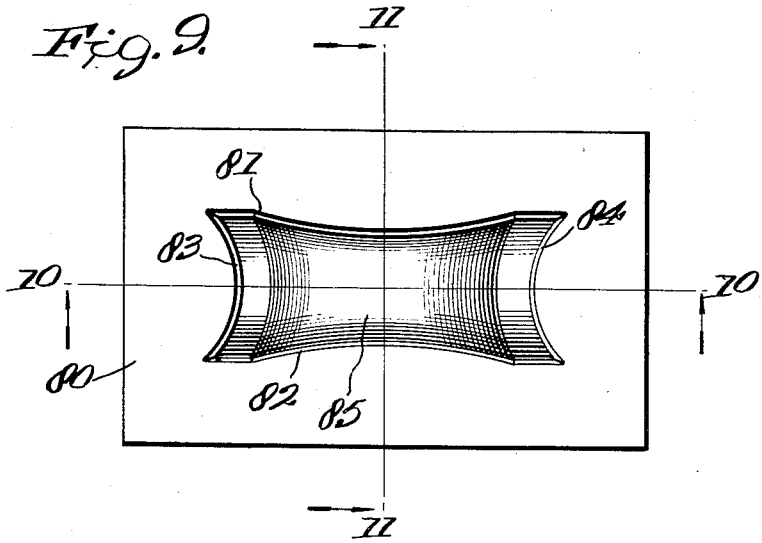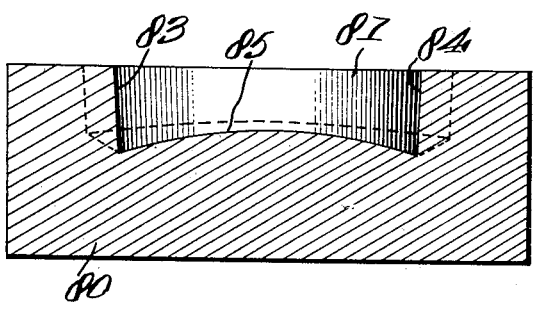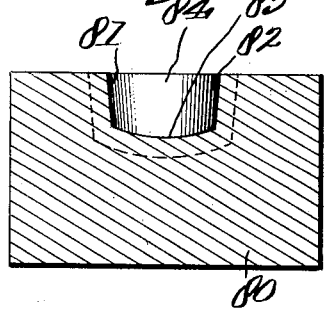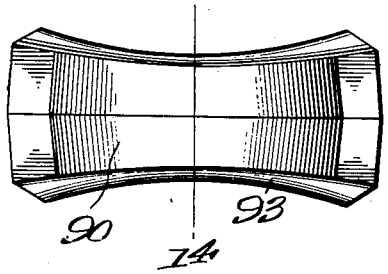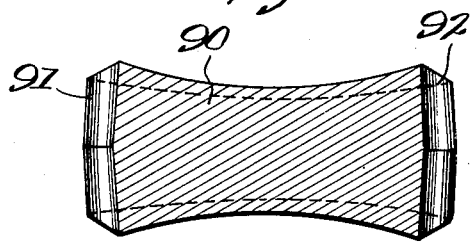

UNITED STATES PATENT OFFICE.

DAMON E. CUMMINGS, OF THE UNITED STATES NAVY.

MILLING-MACHINE.

1,198,333.  Specification of Letters Patent.  Patented Sept. 12, 1916.

Application filed August 16, 1915. Serial No. 45,785.

*To all whom it may concern:*

Be it known that I, DAMON E. CUMMINGS, a citizen of the United States, stationed on board the U. S. S. *Dubuque*, have invented certain new and useful Improvements in Milling-Machines; and I do hereby declare the following to be a full, clear, and exact description of the invention, such as will enable others skilled in the art to which it appertains to make and use the same.

The present invention relates to improvements in milling machines, and consists more particularly in an improved milling machine especially designed for sinking dies for use in the manufacture of drop-forged chain studs, although it will be apparent that the same may have other applications.

Heretofore the dies employed in the manufacture of chain studs by drop-forging have been prepared by the slow and tedious operations of skilled die sinkers, whose time and labor have been a large factor in maintaining the cost of the output of such dies at an exceedingly high figure.

It is an object of the present invention to provide an automatic milling machine for sinking the dies which will reduce the amount of skilled labor now found necessary, and which will be capable of producing a large number of dies in a comparatively short space of time.

Another object of the present invention resides in providing an improved milling machine, the several mechanisms whereof may be adjusted and arranged to cut the die walls with convex or concave curves, accordingly as it may be desirable or necessary to form the corresponding faces of the chain stud convexed or concaved.

It is a further object of the present invention to provide an improved milling machine designed and constructed with several independent and automatically operating mechanisms for superimposing upon the cutting tool several distinct motions for imparting to the die walls the curvature for which the machine has been predetermined and set.

With these and other objects in view the invention consists in the novel details of construction and combinations of parts more fully hereinafter disclosed and particularly pointed out in the claims.

Figure 1:
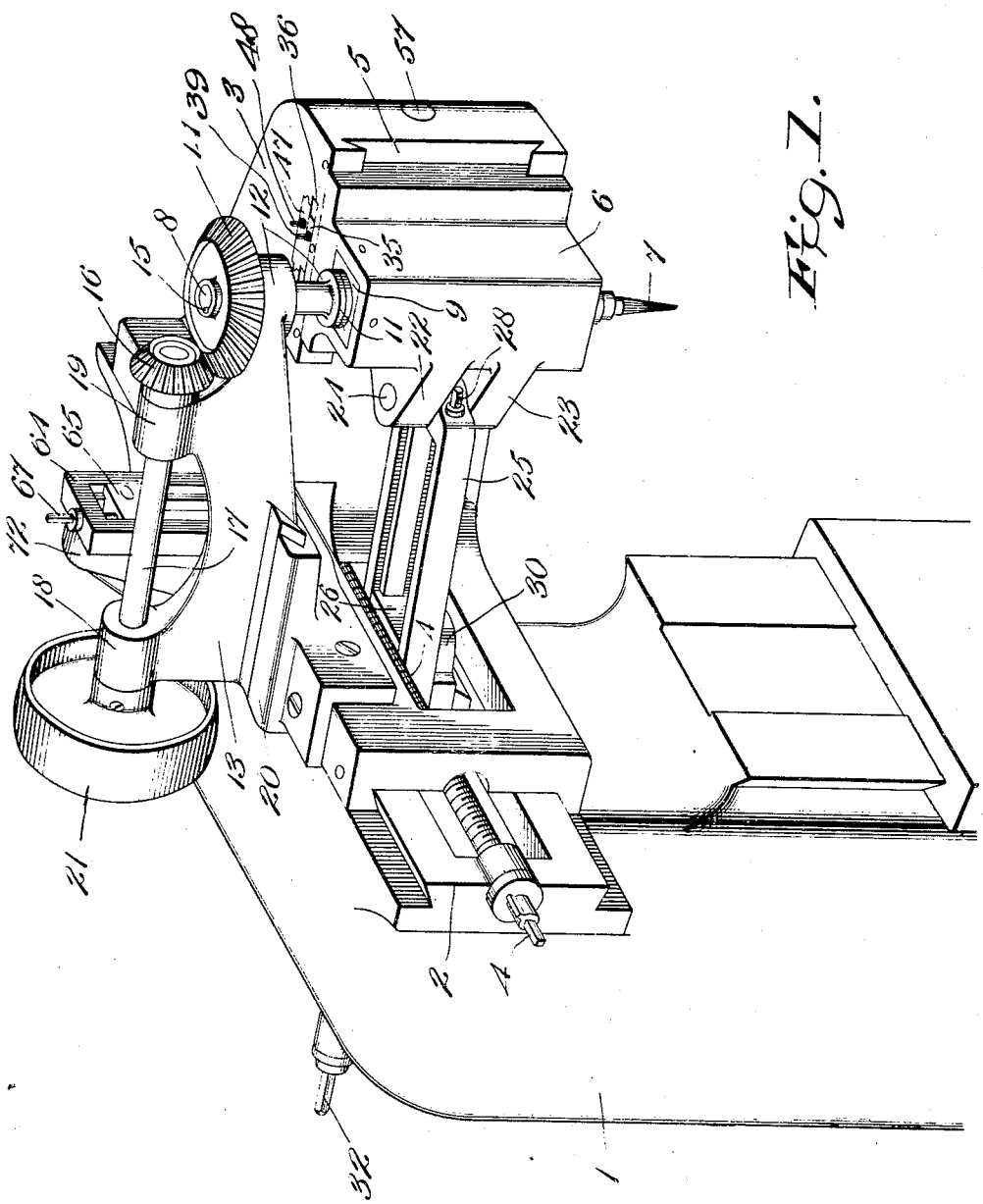
Figure 2:
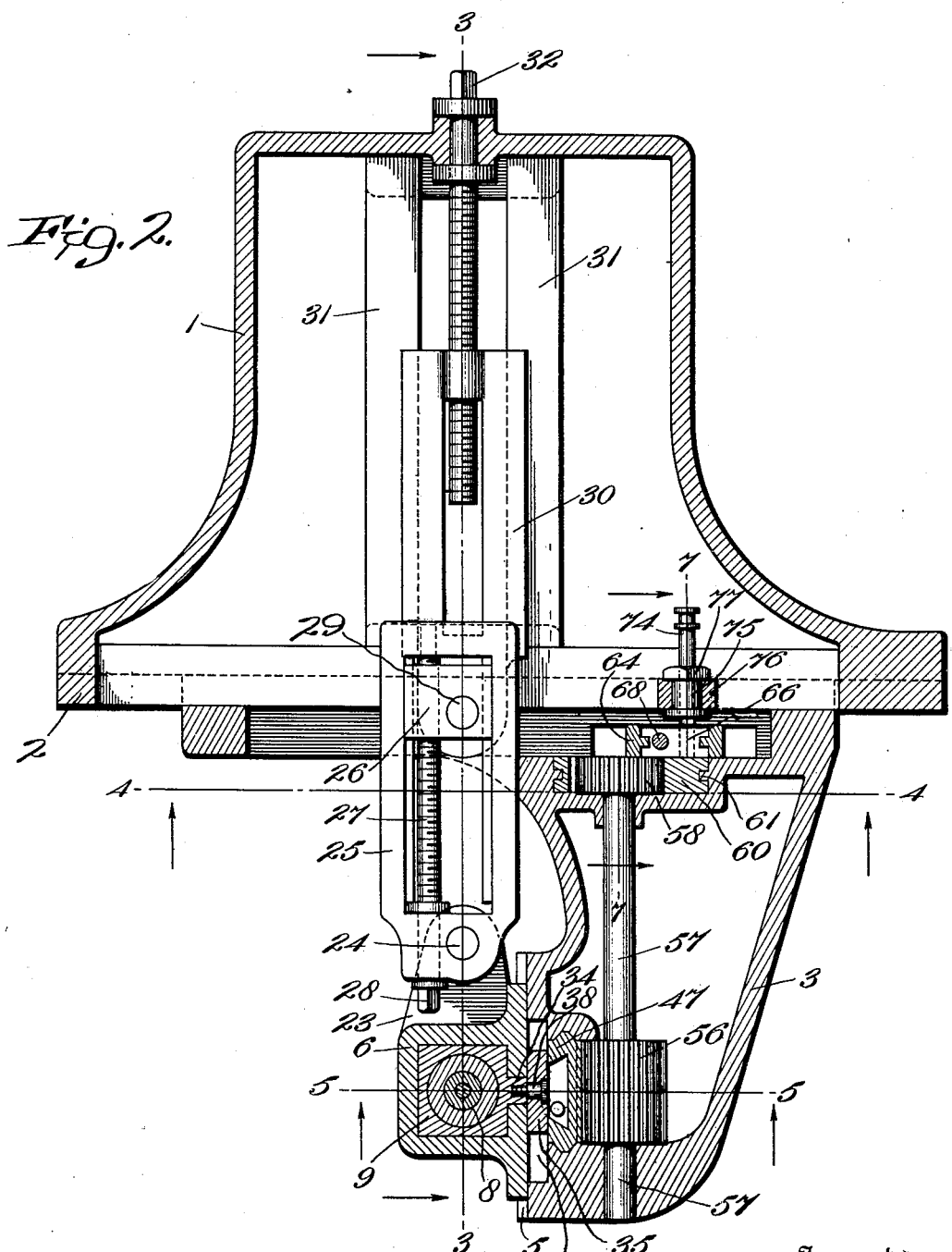
Figure 3:
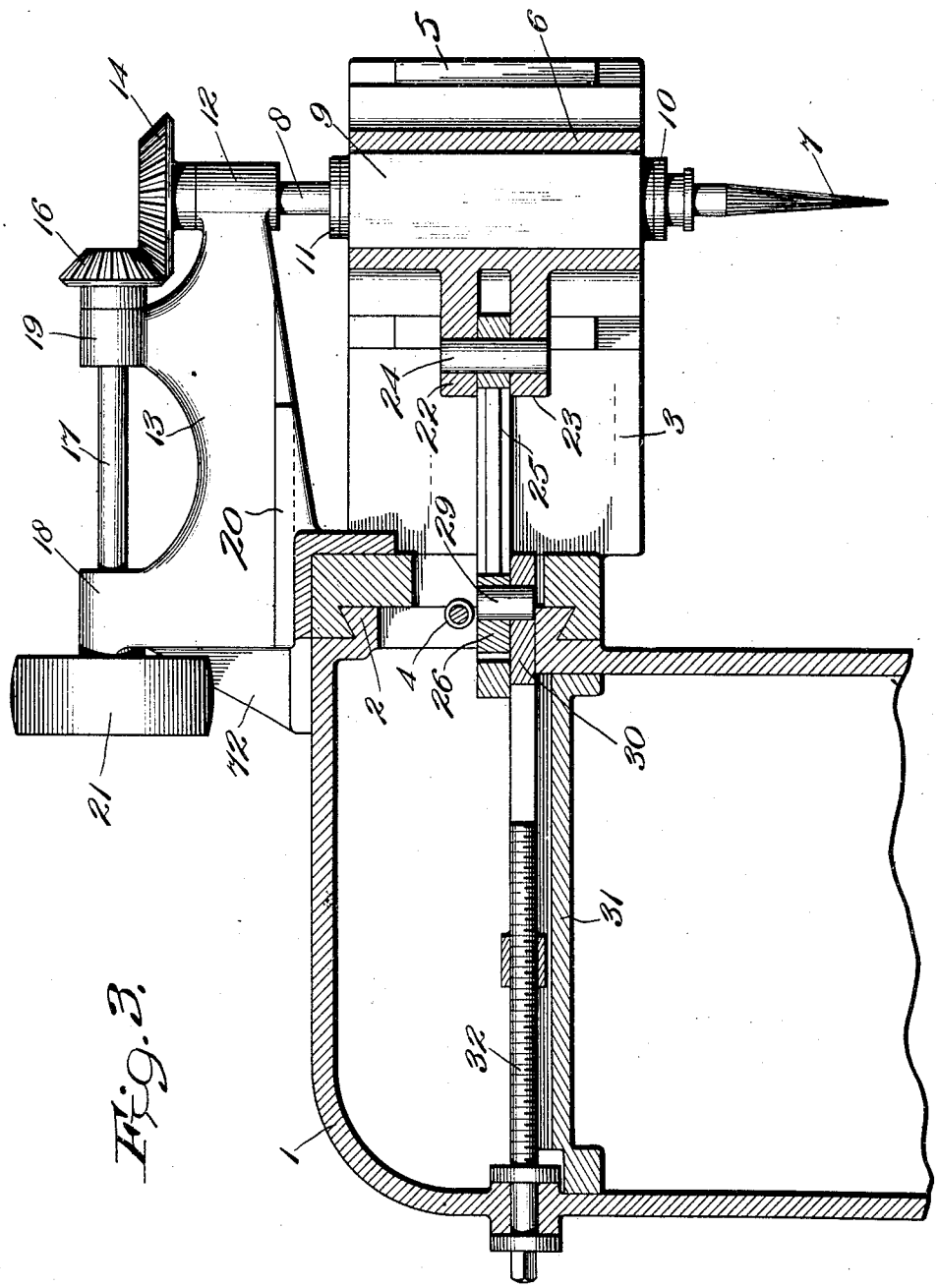
Figure 4:
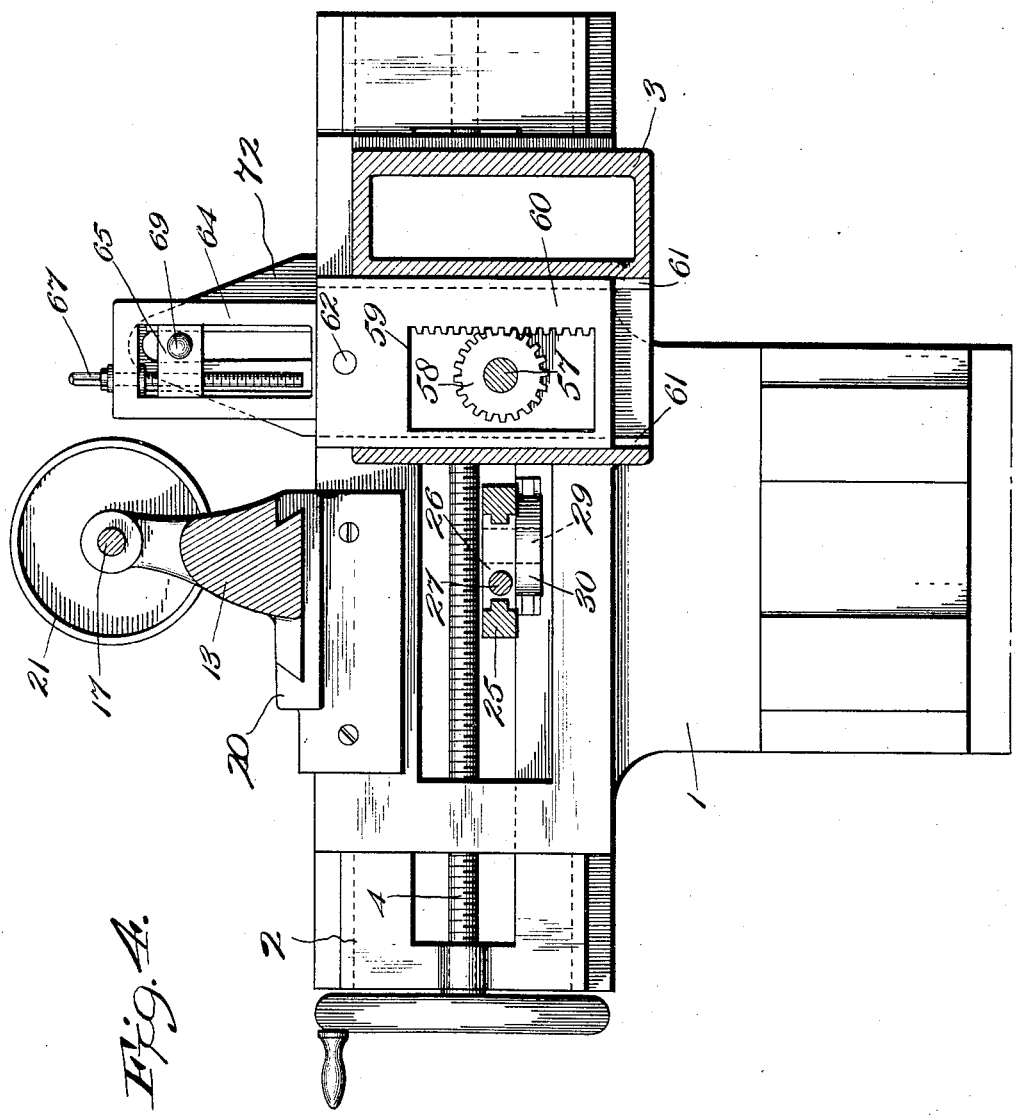
Figure 5:
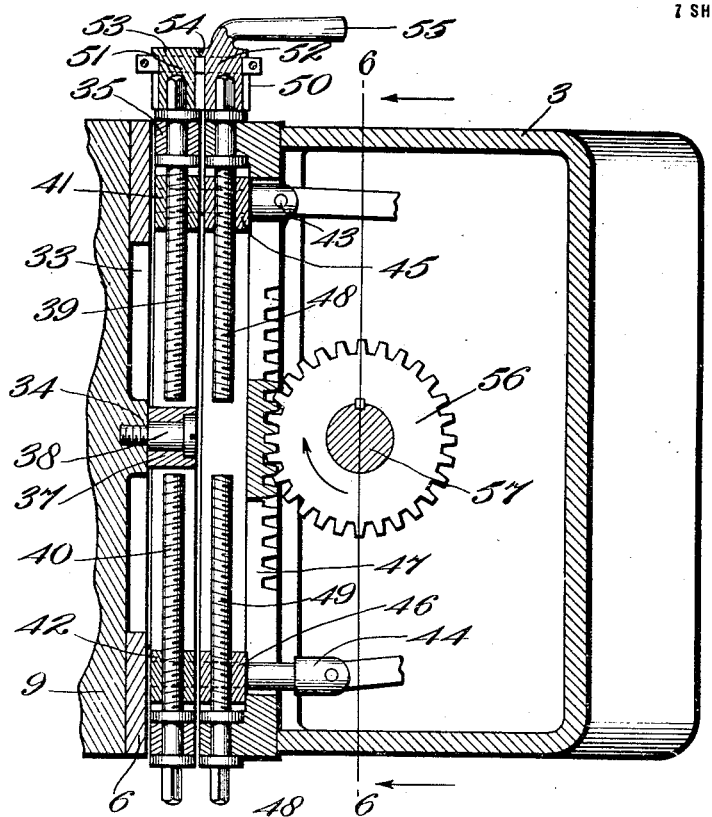
Figure 6:
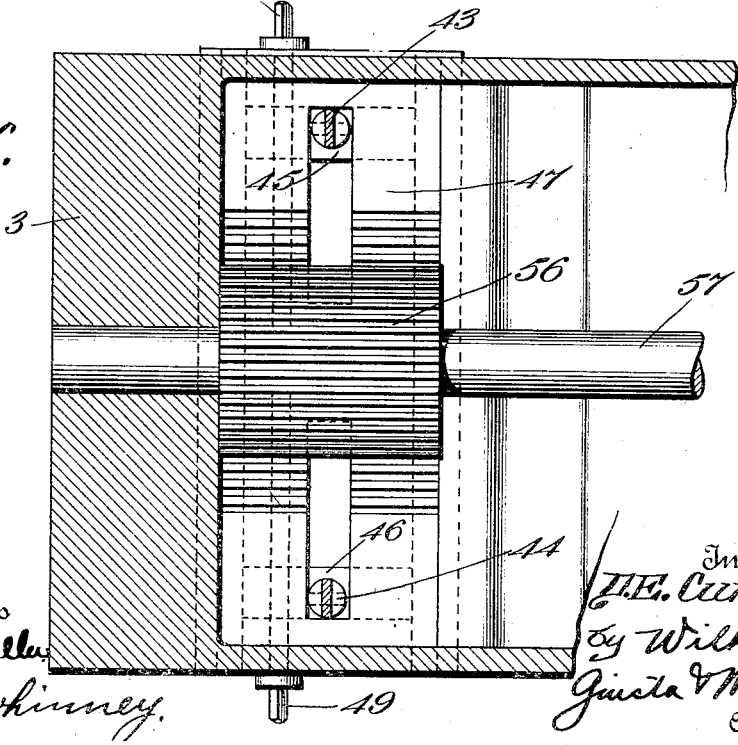

In the accompanying drawings forming a part of this application, and in which similar reference symbols indicate corresponding parts in the several views: Figure 1 is a fragmentary perspective view of an improved milling machine constructed in accordance with the present invention. Fig. 2 is a horizontal sectional view of the same. Fig. 3 is a vertical sectional view taken on the line 3—3 in Fig. 2. Fig. 4 is a transverse sectional view taken on the line 4—4 in Fig. 2. Fig. 5 is an enlarged cross sectional view taken on the line 5—5 in Fig. 2. Fig. 6 is a fragmentary sectional view taken on the line 6—6 in Fig. 5. Fig. 7 is an enlarged fragmentary sectional view taken on the line 7—7 in Fig. 2. Fig. 8 is a similar view taken on the line 8—8 in Fig. 7. Fig. 9 is a top plan view of a die formed by my improved milling machine. Fig. 10 is a longitudinal section therethrough taken on the line 10—10 in Fig. 9. Fig. 11 is a transverse section through the die on the line 11—11 in Fig. 9. Fig. 12 is a side elevational view of a chain stud drop-forged in the die shown in Figs. 9 to 11 inclusive. Fig. 13 is a central sectional view taken on the line 13—13 in Fig. 14; and Fig. 14 is a cross sectional view of the chain stud taken on the line 14—14 in Fig. 12.

Referring more particularly to the drawings, wherein one embodiment of the improved milling machine is illustrated, 1 designates the standard, which is mounted upon the usual base, and constructed at its upper end with a track 2 for slidably receiving a carriage 3, arranged to be moved thereover by a feed screw 4.

At its outer end the carriage 3 provides a guideway 5, in which is slidably mounted a head 6, disposed above the table (not shown), and which may be of any of the numerous types well known in this art. The cutting tool 7 is detachably connected in a chuck carried by the lower end of a spindle 8, journaled vertically in a sleeve 9, mounted for vertical reciprocation in the head 6, and connected to raise and lower said spindle 8 therewith through collars or other suitable means 10 and 11.

As disclosed to advantage in Figs. 1 and 3, the spindle 8 extends upwardly through a bearing 12 on a bracket 13 and through a bevel gear wheel 14, where said spindle is provided with a key 15 for permitting the same to be driven from the gear wheel 14 and to slide vertically therethrough in obedience to the motion imposed by the sleeve 9, as hereinafter more fully described. The gear wheel 14 is arranged in mesh with a bevel pinion 16 mounted on a shaft 17 journaled in bearings 18 and 19 formed on the bracket 13, which latter is slidable in guideways 20 on the carriage 3 to accompany the motion of the head 6 in its traverse over the guideway 5. On the opposite end of the shaft 17 is a pulley 21 for engagement by a belt from any suitable source of power, and through which the spindle 8 and cutting tool may be driven, as will be clearly understood.

The head 6 is formed with a pair of perforated and spaced ears 22 and 23, between which is pivoted, as indicated at 24, a slotted link 25. A block 26 is slidably mounted in the slotted link 25 and is adjustable therein by a threaded rod 27, rotatably journaled longitudinally of said link and provided with a squared or other shaped end 28 for receiving a corresponding shaped tool, whereby the adjustment may be effected. A pivot 29 connects the block 26 with an elongated and slotted cross head 30, mounted to slide in guideways 31 provided by the standard 1, and reciprocated by a feed screw 32 projecting from the rear of said standard, as will more particularly appear from an inspection of Figs. 1, 2 and 3.

As illustrated in Fig. 5, the head 6 is formed with a slot 33 for receiving a projection 34 on the vertically reciprocating sleeve 9. A link 35 is mounted to vertically reciprocate and oscillate horizontally in a slot 36 in the wall of the carriage 3 adjacent the head 6, and is slotted to both sides of a central cross bar 37 perforated to receive a pivot pin 38 threaded in the projection 34 on the sleeve 9. Threaded adjusting rods 39 and 40 are secured in the link 35, and operate to regulate the vertical positions of sliding blocks 41 and 42 respectively, accordingly as it is desired to secure a large or small throw of said link. The sliding blocks 41 and 42 are perforated to receive pins 43 and 44, threaded or otherwise secured through similar and corresponding sliding blocks 45 and 46, mounted in a hollow rack 47 and adjusted similarly by threaded rods 48 and 49. The several threaded adjusting rods in the link 35 and rack 47 are provided with projecting ends, as shown in Fig. 5, for engagement by a tool illustrated in said figure to be constructed of a shell 50, divided to provide adjacent compartments for receiving a pair of members 51 and 52, socketed to engage the projecting ends of said threaded rods, and formed at their upper ends into intermeshing gears 53 and 54, arranged to be simultaneously operated by a handle 55, whereby the adjustment of the several sliding blocks will be uniform to preserve the alinement of the perforations for receiving the pins 43 and 44.

The hollow rack 47 is mounted for vertical reciprocation in the carriage 3, and is arranged in mesh with a pinion 56 mounted fast on a shaft 57 journaled in said carriage, and carrying on its opposite end, as disclosed in Fig. 2, a similar fast pinion 58. The pinion 58 operates in a slot 59 in a rack 60, mounted to reciprocate vertically in guideways 61 provided in a recess in the carriage 3 disposed opposite to the standard 1. The rack 60 is pivotally connected at its upper end by a pin 62 to a central cross bar 63 on a slotted link 64. The link 64, to both sides of the cross bar 63, is constructed with guideways for receiving sliding blocks 65 and 66, adjustable by means of threaded rods 67 and 68 respectively, which are provided with projecting ends for engagement by a suitable tool, as described above in connection with the several other adjusting rods, as will now be readily understood.

The sliding block 65 is perforated to receive a pin 69, adapted to be passed therethrough and through an alining perforation 70 in a clamp 71, adjustably mounted in a bracket 72 and held to position by a nut 73. Similarly, the lower sliding block 66 is arranged to receive a pin 74 passed through a clamp 75, mounted for vertical adjustment in a slot 76 in the standard 1, and held to position by a nut 77.

Referring more particularly to Figs. 9, 10 and 11, 80 designates a die manufactured by the above described milling machine, and sunk with a recess forming the counterpart of a similar die carried by the drop hammer, and being shaped to produce the article illustrated in Figs. 12, 13 and 14. Such recess is bounded by longitudinal convex walls 81 and 82, and by similar convex end walls 83 and 84. The bottom wall 85 is constructed composite of a curve longitudinally convexed, as illustrated in Fig. 10, and transversely concaved, as clearly disclosed in Fig. 11.

The chain stud illustrated in Figs. 12 to 14, inclusive, is formed of a body 90, provided with curved ends 91 and 92 conforming to the walls 83 and 84 of the die 80, the same being arranged to fit opposite sides of the chain link in a manner which will be well understood. The top and bottom faces of the chain stud are formed of a resultant of the composite curved bottom wall 85 of the die, such faces being longitudinally concaved, as illustrated at 93, in Fig. 12, and transversely convexed at 94, in Fig. 14.

The operation of the improved milling machine may be described substantially as follows: A solid block, from which the die 80 is to be cut, is placed upon the table of the machine, and the table is elevated, by any usual mechanism commonly employed for this purpose, to bring the block into engagement with the cutting tool 7. At the commencement of the operation the carriage 3 will be to one side, preferably to the right side, of the central position shown in Figs. 1 and 2, and the cutting tool will be set in motion at the point which is to be the upper right hand corner of the recess in the die 80, shown in Fig. 9.

A skilled operator controls the machine and alternately rotates the feed screws 4 and 32, which may be provided with the usual hand wheels for this purpose. Disregarding, for the present, the motion imposed on the cutting tool 7 for producing the composite curve constituting the base 85 of the die, the convexed longitudinal side wall 81 is formed by the movement of the carriage 3 running over the track 2. This movement is accomplished by rotation of the feed screw 4. As the carriage 3 approaches the central position shown in Fig. 2, the slotted link 25, in swinging about its pivot point 29, which is relatively stationary in the standard 1, will operate to move the head 6 outwardly over the guideway 5. As the carriage 3 moves to the opposite side of said central position, the slotted link will continue to swing about its pivot 29 and will now draw the head 6 inwardly, thus causing the cutting tool 7 to describe the arc of a circle, and in so doing the same will produce the convex wall 81 of the die.

Simultaneously with the above described motion of the carriage 3, whereby the convex wall 81 is formed, the operation of the mechanism for producing the longitudinal convexed curve of the bottom 85 of the die is accomplished in the following manner: The pin 69 being in engagement with the sliding block 65 and clamp 71, and the companion pin 74 disengaged, as in Fig. 7, the carriage 3 is fed from one side of the machine toward the central position illustrated in Fig. 2; and in approaching the center will oscillate the link 64 about the pin 69, and, through the pivot 62, will lower the rack 60, thus rotating the pinion 58. Rotation from the pinion 58 will be transmitted through the shaft 57, to the pinion 56, which will be rotated in the clockwise direction indicated by the arrow in Fig. 5; and will accordingly elevate the hollow rack 47. The hollow rack 47 will, by means of the pin 43, carry the link 35 upwardly, which latter, through the pivot pin 38, will elevate the sleeve 9 carrying the cutting tool 7.

When the central position has been reached and the carriage 3 continued across the track 2, the link 64 will swing upwardly about the pin 69 and will reverse the movement of the rack 60, now elevating the same and consequently reversing the motion of the several associated parts. The shaft 57 and pinion 56 will be rotated in a counter-clockwise direction to lower the hollow rack 47, and through the link 35 depress the sleeve 9 and cutting tool 7. Such motion will cause the cutting tool 7 to describe a vertical arc, necessary to the formation of the longitudinal convex curve of the base 85 of the die, as shown in Fig. 10.

To secure the transverse concave curve of the bottom wall of the die, as shown in Fig. 11, the feed screw 32 is rotated to move the cross head 30 outwardly, carrying therewith the slotted link 25, and moving the head 6 in the guideway 5 independent of the above described motion of said head 6 due to the movement of the carriage 3. As the head 6 is thus moved outwardly the sleeve 9, as shown in Fig. 5, will oscillate the link 35 through the pivot 38, about the pin 43, which oscillating movement will depress the sleeve 9, carrying the cutting tool 7, until the head 6 arrives at a central position, where the pivot 38 and pin 43 will be in a vertical line. By the further outward movement of the head 6 from the operation of the feed screw 32, the link 35 will continue to swing about the pin 43 as a center, and thereupon elevate the sleeve 9 and cutting tool 7. It will thus be seen that, by reason of this traversing movement, a third motion will be imposed on the cutting tool 7 to form a concave arc transversely of the die 80 and forming the curved bottom wall 85, as shown in Fig. 11. The three motions above separately described are superimposed upon the cutting tool 7, and are simultaneously operative during the progress of the work to cut out the several curves indicated and form a recess in the die 80, as shown in Figs. 9 to 11 inclusive.

The skilled operator in charge of the machine, rotates the feed screw 4 intermittently, or step by step, and during the interval operates the feed screw 32 to traverse the head 6 in the guideway 5. These operations are continued alternately until the carriage 3 has been fed across the machine to mill out the required length of recess in the die.

If found desirable or necessary in the manufacture of various types and styles of chain studs to produce an arc of greater or lesser radius forming the side wall 81 of the die, a wide variation is had through the adjustment of the block 26 by the threaded rod 27 in the slotted link 25. By shifting the position of the block 26, the distance between the pivot point 29 and the pivotal connection of the slotted link 25 with the head 6 may be varied, and the consequent motion of the head correspondingly limited or enlarged.

The longitudinal convex arc of the base wall 85, as shown in Fig. 10, may be changed to the inverse concave arc by removing the pin 69, in Fig. 7, and inserting the pin 74 through the clamp 75 and sliding block 66. In thus shifting the pivotal point of the lever 64, the motion of the rack 60 will be inverse to that above described, and the curve imposed on the cutting tool 7 will be correspondingly changed. The curve itself may be varied by adjustment of the blocks 65 and 66 by means of the respective rods 67 and 68, together with a corresponding adjustment of the clamps 71 and 75.

The concave arc, as shown in Fig. 11, may be changed to convex by withdrawing the pin 43, in Fig. 5, and inserting the pin 44, which will cause an inversion of motion of these parts from that above described. Similar adjustment of the pivot pins 43 and 44 from the pin 38, may be effected by rotation of the companion threaded rods 39 and 48, and 40 and 49, by means of the implement illustrated in Fig. 5.

The end convex walls 83 and 84, and the remaining longitudinal wall 82 of the die 80, are formed in a manner similar to the operation above described for producing the longitudinal convex wall 81.

The table of the machine is lowered after the wall 81 and the base 85 have been formed, and the same revolve through ninety degrees to bring either of the end walls 83 or 84 to the position lately occupied by the longitudinal wall 81, and said side walls are then operated upon in a similar manner. The table carrying the die 80 is revolved in a similar manner to bring the opposite longitudinal wall 82 to position for operation, and it will be understood from the foregoing that these several side walls are all cut out by the tool 7 in the motion imposed thereupon by the automatic action of the link 25 in reciprocating the head 6. After the die has been completely formed by the automatic action of the machine in the above described manner, the same is subjected to slight hand finishing, particularly at the surface and ends, and the same is then in completed shape, ready for insertion in the drop-forging apparatus.

It is obvious that those skilled in the art may vary the details of construction and arrangements of parts without departing from the spirit of my invention, and therefore I do not wish to be limited to such features except as may be required by the claims.

I claim:

1. In a milling machine, the combination of a frame, a carriage mounted on said frame, means for feeding said carriage, a cutting tool mounted for vertical movement from said carriage, a link, means connecting said link between the frame and carriage for automatically actuating the link when said carriage is fed, said means including a rack mounted to reciprocate in said carriage and connected to be actuated from said link when said carriage is fed, gear connections between said rack and cutting tool for transmitting vertical motion to the latter, and means for controlling the degree of said motion, substantially as described.

2. In a milling machine, the combination of a frame, a carriage mounted on said frame, means for feeding said carriage, a cutting tool fitted to slide relatively to said carriage, a link, means connecting said link between the frame and carriage for automatically actuating the link when the carriage is fed, said means including a rack mounted to reciprocate in said carriage and connected to be actuated from said link when the carriage is in motion, gear connections between said rack and cutting tool for transmitting said relative movement to the latter, means for controlling the degree of said movement, and means for selectively connecting said link to oscillate in either of two relatively-inverse motions, substantially as described.

3. In a milling machine, the combination of a frame, a carriage mounted on said frame, means for feeding said carriage, a cutting tool mounted for vertical movement from said carriage, a link, means connecting said link for automatic movement between the frame and carriage when the latter is being fed, said means including a rack mounted to reciprocate in said carriage and connected to be actuated from said link when the carriage is fed, a second rack mounted in said carriage, gear connections between said racks, and means for transmitting motion to the cutting tool from said last-named rack, substantially as described.

4. In a milling machine, the combination of a frame, a carriage mounted on said frame, means for feeding said carriage, a cutting tool mounted for vertical movement from said carriage, a link, means connecting said link between the frame and carriage whereby the link will be automatically operated when said carriage is in motion, said means including a rack mounted to reciprocate in said carriage and connected to be operated from said link when the carriage is fed, a second rack mounted in said carriage, gear connections between said racks, and a link arranged between said second-named rack and the cutting tool for transmitting a vertical motion to the latter, substantially as described.

5. In a milling machine, the combination of a frame, a carriage mounted on said frame, means for feeding said carriage, a cutting tool mounted for vertical movement from said carriage, a sleeve movable with said tool, a link connected to vertically reciprocate said sleeve, a rack mounted in said carriage and associated with said link, and means for reciprocating said rack automatically with the movement of said carriage, substantially as described.

6. In a milling machine, the combination of a frame, a carriage mounted on said frame, means for feeding said carriage, a cutting tool mounted for vertical movement from said carriage, a sleeve connected to actuate said cutting tool, a link mounted to reciprocate in said carriage and arranged in connection with said sleeve, a rack in said carriage associated with said link, gear means in mesh with said rack, and means for automatically actuating said gear means from the motion of the carriage imparting vertical movement to said tool, substantially as described.

7. In a milling machine, the combination of a frame, a carriage mounted on said frame, means for feeding said carriage, a cutting tool mounted for vertical movement from said carriage, a sleeve connected to actuate said tool, a link mounted in said carriage and coupled with said sleeve, a rack associated with said link and mounted to reciprocate in said carriage, gear connections meshing with said rack, a second rack also meshing with said gear connections, and means for automatically reciprocating said last-named rack from the motion of the carriage to impart vertical movement to the cutting tool, substantially as described.

8. In a milling machine, the combination of a frame, a carriage on said frame, means for feeding said carriage over the frame, a relatively shiftable tool supported from said carriage, and automatic means for shifting said tool with reference to said carriage as the latter proceeds over the frame, said automatic means including a pivoted link arranged between the frame and carriage, a pair of complemental members on said frame and link disposed to each side of the link pivot, and means for selectively connecting either pair of members to secure either relatively-inverse motion of said link, substantially as described.

9. In a milling machine, the combination of a frame, a carriage on said frame, means for feeding said carriage over the frame, a relatively shiftable tool supported from said carriage, and automatic means for shifting said tool with reference to said carriage as the latter proceeds over the frame, said automatic means including a pivoted link arranged between the frame and carriage, a pair of complemental members on said frame and link disposed to each side of the link pivot, means for selectively connecting either pair of members to secure either relatively-inverse motion of said link and means for adjusting said several members with reference to the link pivot for varying the throw of said link and correspondingly limiting or enlarging the motion of said tool, substantially as described.

10. In a milling machine, the combination of a frame, a carriage on said frame, means for feeding said carriage over the frame, a relatively-shiftable tool supported from said carriage, and automatic means embracing a chain of elements for shifting said tool with reference to said carriage as the latter proceeds over the frame, said automatic means including a link arranged to rock between said frame and carriage, an intermediate pivot connecting said link to one element of said chain of elements, perforated blocks fitted to slide in said link one to either side of said pivot, means for moving said blocks to adjust the same with respect to the pivot, perforated clamps on said frame complemental to said blocks, means for adjusting said clamps to correspond with the adjustment of said blocks, and a pin for engaging through the registering perforations in either pair of said blocks and clamps for connecting the link to swing from said frame in accordance with either relatively-inverse motion, substantially as described.

11. In a milling machine, the combination of a frame, a carriage mounted on said frame, means for feeding said carriage over the frame, a head mounted to move independently in said carriage, a cutting tool fitted to move relatively in said head, means for traversing said head in the carriage, means connected to automatically move said tool relatively when said head is traversed, and means for adjusting said last-named means to vary the degree of movement of the cutting tool, substantially as described.

12. In a milling machine, the combination of a frame, a carriage mounted on said frame, means for feeding said carriage over the frame, a head mounted to move independently in said carriage, a cutting tool fitted to move ralatively in said head, means for traversing said head in the carriage, means connected to automatically move said tool relatively when said head is traversed, and means for selectively connecting said last-named means to impose on the tool either a direct or inverse motion, substantially as described.

13. In a milling machine, the combination of a frame, a carriage mounted on said frame, means for feeding said carriage over the frame, a head mounted to move independently in said carriage, a cutting tool fitted to move relatively in said head, means for traversing the head in said carriage, means for automatically reciprocating the cutting tool in said head when the latter is traversed, adjusting devices associated with said last-named means for regulating the degree of movement of said cutting tool, and means for inverting the relative reciprocatory movement of the cutting tool, substantially as described.

14. In a milling machine, the combination of a frame, a carriage mounted on said frame, means for feeding said carriage over the frame, a head mounted to move independently in said carriage, a cutting tool fitted to move relatively in said head, means for rotating said cutting tool, a link connected to automatically move said tool relatively when said head is traversed, and means for traversing said head in the carriage, substantially as described.

15. In a milling machine, the combination of a frame, a carriage mounted on said frame, means for feeding said carriage over the frame, a head mounted to move independently in said carriage, a cutting tool fitted to move relatively in said head, means for traversing the head in said carriage, a link mounted to oscillate between said head and carriage for automatically shifting the cutting tool relatively, and adjustable pivotal connections for said link, substantially as described.

16. In a milling machine, the combination of a frame, a carriage mounted on said frame, means for feeding said carriage over the frame, a head mounted to move independently in said carriage, a cutting tool fitted to move relatively in said head, means for traversing the head in said carriage, a link connected to automatically shift the cutting tool relatively when said head is traversed, a plurality of adjustable pivotal connections for said link, and means for connecting either of the pivotal connections for inverting the direction of movement of the cutting tool, substantially as described.

17. In a milling machine, the combination of a frame, a carriage mounted on said frame, means for feeding said carriage over the frame, a head mounted to move independently in said carriage, a cutting tool fitted to move vertically in said head, a link connected between the frame and said head for automatically traversing the latter when the carriage is fed, means for manually shifting said link, and means for shifting the cutting tool vertically when the head is traversed, substantially as described.

18. In a milling machine, the combination of a frame, a carriage mounted on said frame, means for feeding said carriage over the frame, a head mounted to move independently in said carriage, a cutting tool fitted to move vertically in said head, a link connected to traverse said head in the carriage, a cross head slidably mounted in said frame and connected to said link, means for shifting said cross head in either direction, and means for automatically moving the cutting tool vertically when said head is traversed, substantially as described.

19. In a milling machine, the combination of a frame, a carriage mounted on said frame, means for feeding said carriage over the frame, a head mounted to move independently in said carriage, a cutting tool fitted to move vertically in said head, a link connected to traverse said head, a sliding cross head mounted in the frame and connected to said link, feed means for operating said cross head, and a link connected to automatically raise and lower said cutting tool when the head is traversed, substantially as described.

20. In a milling machine, the combination of a frame, a carriage mounted on said frame, means for feeding said carriage, a head fitted to slide in said carriage, means for traversing the head in said carriage, a relatively shiftable cutting tool fitted in said head, a pivoted link connected between said head and carriage for automatically shifting the cutting tool relatively when the head is traversed in the carriage, a pair of complemental members supported from said carriage and link and disposed one pair to each side of the link pivot, and means for selectively connecting either pair of members to secure either relatively-inverse motions of said link, substantially as described.

21. In a milling machine, the combination of a frame, a carriage mounted on said frame, means for feeding said carriage, a head fitted to slide in said carriage, means for traversing the head in said carriage, a relatively shiftable cutting tool fitted in said head, a pivoted link connected between said head and carriage for automatically shifting the cutting tool relatively when the head is traversed in the carriage, a pair of complemental members supported from said carriage and link and disposed one pair to each side of the link pivot, means for selectively connecting either pair of members to secure either relatively inverse motions of said link, and means for adjusting said members in pairs with reference to the link pivot for varying the throw of said link and correspondingly limiting or enlarging the relatively shiftable motion of said tool, substantially as described.

22. In a milling machine, the combination of a frame, means for feeding said carriage, a relatively slidable head mounted in said carriage, means for traversing the head in said carriage, a sleeve relatively slidable in said head, a cutting tool supported to move with said sleeve, a link, an intermediate pivot connecting said link to said sleeve, a slidable block mounted in said link to either side of said pivot, means for adjusting the positions of said blocks with respect to the link pivot, complemental blocks supported from said carriage, means for adjusting said blocks to correspond with the positions of the blocks on said link, and a pivot for connecting either set of said blocks for causing the link to oscillate in accordance with either a direct or inverse motion, substantially as described.

23. In a milling machine, the combination of a frame, a carriage on said frame, feed means for said carriage, a tool movably supported from said carriage, means for automatically moving said tool to follow a horizontal arc as the carriage is fed, and automatic means for simultaneously causing the tool to describe a vertical arc, substantially as described.

24. In a milling machine, the combination of a frame, a carriage on said frame, feed means for said carriage, a tool supported to slide axially and move in a direction angular to the axis thereof and to the path of said carriage, means for automatically shifting said tool axially, adjustable means for controlling the axial motion of said tool, means for automatically moving said tool angularly to its axis and the carriage path, and means for adjusting said last-named means to vary the motion of the tool, substantially as described.

25. In a milling machine, the combination of a frame, a tool movably supported from said frame, means for automatically moving said tool in a horizontally arcuate path, means for simultaneously actuating said tool to describe a vertical arc, and selective means for connecting said last-named means to develop direct or inverse vertical arcs, substantially as described.

26. In a milling machine, the combination of a frame, a tool movably supported from said frame, means for automatically moving said tool in a horizontally arcuate path, means for adjusting said means to vary the radius of the arcuate path, means for simultaneously actuating said tool to describe a vertical arc, selective means for connecting said last-named means to develop direct or inverse vertical arcs, and means associated with said last-mentioned means for regulating the radius of the vertical arcs, substantially as described.

27. In a milling machine, the combination of a frame, a carriage mounted in said frame, means for feeding said carriage, a head mounted to slide independently in said carriage, a link for automatically moving said head in the carriage while the same is being fed, a cutting tool mounted to move relatively in said head, and means for relatively moving the cutting tool simultaneous with the movement of said carriage, substantially as described.

28. In a milling machine, the combination of a frame, a carriage mounted on said frame, feed means for said carriage, a head fitted to slide in said carriage angularly to the path thereof, means for automatically sliding the head in said carriage when the latter is being fed, a cutting tool mounted to move relatively in said head, means for relatively moving the cutting tool from the movement of said carriage, and means for controlling the degree of said movement, substantially as described.

29. In a milling machine, the combination of a frame, a carriage mounted on said frame, feed means for said carriage, a head mounted to slide independently in the carriage and angularly to the path thereof, a link connected between said head and the frame for automatically moving the former in said carriage while the same is being fed, a cutting tool fitted to reciprocate vertically in said head, means for automatically raising and lowering the cutting tool during the progress of said carriage, and means for adjusting the throw of movement of the cutting tool, substantially as described.

30. In a milling machine, the combination of a frame, a carriage mounted on said frame, means for feeding said carriage, a head mounted to slide independently in said carriage and angularly with respect to the path of the same, a link connected between said frame and head for automatically traversing the same in the said carriage when the latter is in motion, means for adjusting the radial throw of said link, a cutting tool mounted to move relatively in said head, means for automatically shifting the cutting tool relatively during the progress of said carriage, and means for adjusting and controlling the degree of relative movement of the cutting tool, substantially as described.

31. In a milling machine, the combination of a frame, a carriage mounted on said frame, feed means for said carriage, a head mounted to slide independently in said carriage, means for automatically reciprocating said head in the carriage when the latter is being fed, a cutting tool fitted to reciprocate vertically in said head, a link connected between the frame and said carriage and adapted to be actuated on the movement of the latter, means for adjusting the throw of said link, means for connecting said link for inverse operation, and connections between said link and the cutting tool for automatically reciprocating the same during the movement of the carriage, substantially as described.

32. In a milling machine, the combination of a frame, a carriage mounted on said frame, feed means for said carriage, a head fitted to slide independently in said carriage and angularly to the path thereof, an adjustable link connected between said frame and head for automatically moving the same in said carriage when the latter is being fed, a tool fitted to reciprocate vertically in said head, means for rotating said tool, a link connected between said frame and carriage and adapted to be actuated upon the motion of the latter, a rack actuated from said link, and connections between said rack and the cutting tool for automatically reciprocating the latter during the motion of said carriage, substantially as described.

33. In a milling machine, the combination of a frame, a carriage mounted on said frame, means for feeding said carriage, a guideway on said carriage, a head fitted to reciprocate in said guideway, a link connected between said head and frame for automatically reciprocating the former while said carriage is being fed, a cutting tool fitted to reciprocate vertically in said head, a link arranged between said frame and carriage and actuated from the motion of the latter, a rack on said carriage actuated from said link, a second rack fitted to reciprocate in said carriage and connected to vertically reciprocate said cutting tool, and gear connections between said racks, substantially as described.

34. In a milling machine, the combination of a frame, a carriage mounted on said frame, means for feeding said carriage, a guideway formed on said carriage at right angles to the path of movement thereof, a head fitted to slide in said guideway, a link connected between said frame and head for reciprocating the latter when the carriage is being fed, an adjustable pivot for regulating the radial throw of said link, a cutting tool fitted to reciprocate vertically in said head, means for rotating said tool, a second link interposed between the frame and said carriage and arranged to be oscillated on the movement of the latter, means for regulating the throw of said second link, means for reversing the motion of said last-named link, and connections between said link and cutting tool for automatically reciprocating the same during the progress of said carriage, substantially as described.

35. In a milling machine, the combination of a frame, a carriage mounted on said frame, feed means for said carriage, a guideway on said carriage, a head mounted to slide in said guideway angularly to the path of the carriage, an adjustable link mounted between said frame and head for reciprocating the latter on the motion of the carriage, a cutting tool, a sleeve carrying said cutting tool and fitted for vertical reciprocation in said head, a rack fitted in said carriage and in connection to reciprocate said sleeve, and means for automatically actuating said rack to move the sleeve and cutting tool vertically, substantially as described.

36. In a milling machine, the combination of a frame, a carriage on said frame, feed means for said carriage, a head mounted to move independently in said carriage, a tool supported for independent movement in said head, means for automatically moving the head in said carriage as the latter is fed, and automatic means interposed between said head and carriage for shifting the tool in the former when the same is being moved in the carriage, substantially as described.

37. In a milling machine, the combination of a frame, a carriage on said frame, feed means for said carriage, a head mounted to move independently in said carriage, a tool supported for independent movement in said head, means for automatically moving the head in said carriage as the latter is fed, automatic means interposed between said head and carriage for shifting the tool in the former when the same is being moved in the carriage, and means for connecting said automatic means to operate inversely and produce a corresponding inverse motion in said tool, substantially as described.

38. In a milling machine, the combination of a frame, a carriage mounted on said frame, means for feeding said carriage, a head mounted to move independently in said carriage, means for automatically moving the head in said carriage as the same is being fed, means independent of said last-named means for traversing the head in said carriage, a cutting tool fitted to move relatively in said head, means for relatively moving said cutting tool when the head is traversed in said carriage, and means for adjusting said last-named means to regulate the relative movement of the cutting tool, substantially as described.

39. In a milling machine, the combination of a frame, a carriage mounted on said frame, means for feeding said carriage, a head mounted to move independently in said carriage, means for automatically moving the head in said carriage as the same is being fed, means independent of said last-named means for traversing the head in said carriage, a cutting tool fitted to move relatively in said head, means for relatively shifting said cutting tool when the head is moved in said carriage, and means for changing the motion of said last-named means for correspondingly inverting the relative motion of said cutting tool, substantially as described.

40. In a milling machine, the combination of a frame, a carriage mounted on said frame, means for feeding said carriage, a head mounted to move independently in said carriage, means for automatically moving the head in said carriage as the same is being fed, means independent of said last-named means for traversing the head in said carriage, a cutting tool fitted to move relatively in said head, means for relatively moving said cutting tool when the head is traversed in said carriage, means for adjusting said last-named means to regulate the relative movement of the cutting tool, and means for changing the motion of said last-named means for correspondingly changing the relative movement of said cutting tool, substantially as described.

41. In a milling machine, the combination of a frame, a carriage mounted on said frame, means for feeding said carriage, a head mounted to move independently in said carriage, a link connected between said head and frame for automatically reciprocating the former in said carriage when the latter is being fed, means for adjusting the radial throw of said link, means associated with said link for traversing the head in said carriage independently of the automatic movement thereof, a cutting tool fitted to reciprocate vertically in said head, and a link connected between said carriage and head for automatically shifting the cutting tool vertically when said head is moved in the carriage, substantially as described.

42. In a milling machine, the combination of a frame, a carriage mounted on said frame, means for manually feeding said carriage, a slidable head supported in said carriage, a link connected between said frame and head for automatically traversing the latter while the carriage is being fed, means for adjusting the radial throw of said link to vary the degree of movement of said head, independent manually-operated means for traversing the head in said carriage, a sleeve fitted to move relatively in said head, a cutting tool revolubly connected to move with said sleeve, a link connected between said head and the carriage, a pivot connecting said link with the sleeve for automatically shifting the latter in said head, and means for selectively connecting said link for either of two relatively inverse motions, substantially as described.

43. In a milling machine, the combination of a frame, a carriage mounted on said frame, means for manually feeding said carriage, a slidable head supported in said carriage, a link connected between said frame and head for automatically traversing the latter while the carriage is being fed, means for adjusting the radial throw of said link to vary the degree of movement of said head, independent manually-operated means for traversing the head in said carriage, a sleeve fitted to move relatively in said head, a cutting tool revolubly connected to move with said sleeve, a link connected between said head and the carriage, a pivot connecting said link with the sleeve for automatically shifting the latter in said head, blocks fitted to slide in said link one to each side of the link pivot, means for adjusting said blocks, complemental blocks supported from the carriage, means for adjusting said last-named blocks to agree with the adjustment of the first-named blocks, and a pivot pin for selectively connecting either set of blocks to cause the link to oscillate in conformity with either a direct or inverse motion, substantially as described.

44. In a milling machine, the combination of movable means, a relatively shiftable tool supported from said movable means, means for automatically shifting said tool in the movable means when the latter is in motion, and automatic means for superimposing an additional shifting motion on said tool independent of the motion derived from said last-named means, substantially as described.

45. In a milling machine, the combination of movable means, a relatively shiftable tool supported from said movable means, means for automatically shifting said tool in the movable means when the latter is in motion, adjustable means for regulating the degree of movement of said last-named means to vary the motion of the tool, and automatic means for superimposing an additional shifting motion on said tool, substantially as described.

46. In a milling machine, the combination of movable means, a relatively shiftable tool supported from said movable means, means for automatically shifting said tool in the movable means when the latter is in motion, automatic means for superimposing an additional shifting motion on said tool, and selective means for connecting said last-named means to develop an inverse shifting motion of the tool, substantially as described.

47. In a milling machine, the combination of movable means, a relatively shiftable tool supported from said movable means, means for automatically shifting said tool in the movable means when the latter is in motion, adjustable means for regulating the degree of movement of said last-named means to vary the motion of the tool, automatic means for superimposing an additional shifting motion on said tool in the same direction, adjustable means for varying the degree of motion of said automatic means, and selective means for connecting both of said tool shifting means to develop an inverse shifting motion of the tool, substantially as described.

48. In a milling machine, the combination of a frame, a carriage mounted on said frame, means for feeding said carriage, a head mounted to move independently in said carriage, means for traversing the head in said carriage, a cutting tool fitted to reciprocate vertically in said head, automatic means for moving said cutting tool vertically during the progress of said carriage, and means independent of said last-named means for shifting the cutting tool vertically when the head is traversed in said carriage, substantially as described.

49. In a milling machine, the combination of a frame, a carriage mounted on said frame, means for feeding said carriage, a head mounted to move independently in said carriage, means for traversing the head in said carriage, a cutting tool fitted to reciprocate vertically in said head, automatic means for reciprocating said cutting tool vertically when the carriage is being fed, means for adjusting said last-named means to regulate the degree of movement of the cutting tool, and independent means for shifting the cutting tool vertically when said head is traversed in the carriage, substantially as described.

50. In a milling machine, the combination of a frame, a carriage mounted on said frame, means for feeding said carriage, a head mounted to move independently in said carriage, means for traversing the head in said carriage, a cutting tool fitted to reciprocate vertically in said head, means interposed between said frame and carriage for reciprocating the cutting tool when the carriage is in motion, means for reversing said last-named means to change the direction of motion of the cutting tool, means for independently shifting said cutting tool vertically when said head is traversed in the carriage, and selective means for connecting said last-named means to produce correlatively inverse motions in said tool, substantially as described.

51. In a milling machine, the combination of a frame, a carriage mounted on said frame, means for feeding said carriage, a head mounted to move independently in said carriage, means for traversing the head in said carriage, a cutting tool fitted to reciprocate vertically in said head, a link interposed between said frame and carriage and arranged to be oscillated on the movement of the latter, connections between said link and the cutting tool for moving the same vertically, a link included in said connections for independently shifting said cutting tool vertically when said head is traversed in the carriage, and means for adjusting the throw of said last-named link, substantially as described.

52. In a milling machine, the combination of a frame, a carriage mounted on said frame, means for feeding said carriage, a head mounted to move independently in said carriage, means for traversing the head in said carriage, a cutting tool fitted to reciprocate vertically in said head, a link interposed between said frame and carriage and arranged to be oscillated on the movement of the latter, means for adjusting the throw of said link, means for connecting said link for inverse operation, connections arranged between said link and the cutting tool for vertically reciprocating the latter on the motion of said carriage, a second link included in said connections for independently shifting the cutting tool vertically when said head is traversed in the carriage, means for adjusting the throw of said last-named link, and means for connecting said last-named link for inverse operation, substantially as described.

53. In a milling machine, the combination of movable means, a relatively shiftable tool supported from said movable means, means for operating said movable means to carry the tool through one motion, a device for adjusting said last-named means to regulate the degree of the tool motion, automatic means for simultaneously shifting the tool relatively to said movable means, a device for adjusting said automatic means to vary the shifting movement of the tool, means for superimposing on the tool an additional relatively shifting motion, and a device for adjusting said last-named means to vary such additional shifting movement of the tool, substantially as described.

54. In a milling machine, the combination of movable means, a relatively shiftable tool supported from said movable means, means for operating said movable means to carry the tool through one motion, automatic means for simultaneously shifting the tool relatively to said movable means, selective means associated with said automatic means for connecting the elements thereof to produce either a direct or inverse motion, means for superimposing on the tool an additional relatively shifting motion, and selective means associated with said last-named means for connecting the elements thereof to develop a direct or inverse shifting motion, substantially as described.

55. In a milling machine, the combination of movable means, a relatively shiftable tool supported from said movable means, means for operating said movable means to carry the tool through one motion, a device for adjusting said last-named means to regulate the degree of the tool motion, automatic means for simultaneously shifting the tool relatively to said movable means, a device for adjusting said automatic means to regulate the shifting movement of said tool, an agency associated with said automatic means for connecting the elements thereof to produce either a direct or inverse shifting motion, means for superimposing on the tool an additional relatively shifting motion, a device for adjusting said last-named means to regulate the degree of such additional shifting motion, and an agency associated with said last-named means for connecting the elements thereof to produce either a direct or inverse additional shifting motion, substantially as described.

56. In a milling machine, the combination of a frame, a carriage mounted on said frame, means for feeding said carriage, a head mounted to move independently in said carriage, means for automatically moving the head in said carriage while the latter is being fed, a relatively shiftable tool fitted in said head, means for independently traversing the head in said carriage, means for moving said cutting tool relatively during the movement of said carriage, and means for independently shifting the cutting tool relatively when said head is traversed in the carriage, substantially as described.

57. In a milling machine, the combination of a frame, a carriage mounted on said frame, means for feeding said carriage, a head mounted to move independently in said carriage, automatic means for reciprocating the head in said carriage while the latter is being fed, means for adjusting said last-named means to vary the movement of said head, a cutting tool fitted to reciprocate vertically in said head, automatic means for vertically reciprocating said cutting tool while the carriage is being fed, means for adjusting said last-named means to regulate the movement of said cutting tool, means for independently shifting said cutting tool vertically when the head is moved in said carriage, and means for adjusting said last-named means to regulate said movement of the cutting tool, substantially as described.

58. In a milling machine, the combination of a frame, a carriage mounted on said frame, means for feeding said carriage, a head mounted to move independently in said carriage, means for automatically moving the head in said carriage while the latter is being fed, a relatively shiftable cutting tool fitted in said head, means for automatically shifting said cutting tool relatively during the progress of said carriage, means for connecting said last-named means for inverse operation, means for independently shifting the cutting tool relatively when said head is moved in the carriage, and means for connecting said last-named means for inverse operation, substantially as described.

59. In a milling machine, the combination of a frame, a carriage mounted on said frame, means for feeding said carriage, a head mounted to move independently in said carriage, means for automatically moving the head in said carriage as the latter is being fed, a device for adjusting said means to regulate the degree of movement of the head, a relatively shiftable cutting tool fitted in said head, means for shifting the cutting tool relatively during the progress of said carriage, an instrumentality for adjusting and inverting the motion of said last-named means, means for independently automatically shifting the cutting tool relatively when the head is traversed in said carriage, and an instrumentality for adjusting and inverting the motion of said last-named means, substantially as described.

60. In a milling machine, the combination of a frame, a carriage mounted on said frame, means for feeding said carriage, a head mounted to move independently in said carriage, a link connected between said frame and head for automatically moving the latter in said carriage while the same is being fed, means for adjusting the radial throw of said link, means associated with said link for independently traversing the head in said carriage, a second link interposed between the frame and said carriage and arranged to be automatically oscillated on the movement of the latter, means for adjusting the throw of said second link, means for inverting the motion of said second link, an axially reciprocating cutting tool fitted in said head, connections between said second link and cutting tool for automatically reciprocating the latter when said carriage is moved, a third link included in said connections and adapted to independently shift said cutting tool axially when the head is being traversed, and means for adjusting and inverting the motion of said third link, substantially as described.

In testimony whereof, I affix my signature.

DAMON E. CUMMINGS.

Copies of this patent may be obtained for five cents each, by addressing the "Commissioner of Patents, Washington, D. C."